(12) United States Patent
Roth et al.

(10) Patent No.: US 9,443,108 B1
(45) Date of Patent: Sep. 13, 2016

(54) SECURE TIMESTAMPING

(71) Applicant: Amazon Technologies, Inc., Reno, NV (US)

(72) Inventors: Gregory Branchek Roth, Seattle, WA (US); Matthew John Campagna, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 57 days.

(21) Appl. No.: 14/318,314

(22) Filed: Jun. 27, 2014

(51) Int. Cl.
*G06F 21/70* (2013.01)
*H04L 9/32* (2006.01)

(52) U.S. Cl.
CPC ............. *G06F 21/70* (2013.01); *H04L 9/3247* (2013.01)

(58) Field of Classification Search
CPC ... H04L 9/3294; H04L 63/12; H04L 63/123; H04L 9/3247; G06F 21/70
USPC ....................................................... 713/178
See application file for complete search history.

(56) References Cited

U.S. PATENT DOCUMENTS

| | | | | |
|---|---|---|---|---|
| 7,664,958 B2* | 2/2010 | Moskowitz | ........... | G06T 1/0028 382/100 |
| 8,272,060 B2* | 9/2012 | Milliken | ............... | G06F 21/562 713/178 |
| 2013/0125228 A1* | 5/2013 | Do | .......................... | G06F 21/33 726/9 |
| 2014/0108800 A1* | 4/2014 | Lawrence | ............. | H04L 9/3297 713/168 |
| 2014/0218191 A1* | 8/2014 | Hollender | .............. | G05B 15/02 340/506 |

OTHER PUBLICATIONS

How to Time-Stamp a Digital Document Stuart Haber W. Scott Stornetta Appeared, with minor editorial changes, in Journal of Cryptology, vol. 3, No. 2, pp. 99-111, 1991.*

* cited by examiner

*Primary Examiner* — Kambiz Zand
*Assistant Examiner* — Benjamin Kaplan
(74) *Attorney, Agent, or Firm* — Davis Wright Tremaine LLP

(57) ABSTRACT

A method and system for retrieving a current and previous timestamp value, retrieving a previous accumulator value reflecting a previous state of the accumulator, retrieving information representing digests collected during an interval window, and generating a new accumulator value based on the retrieved values, and a storage medium with executable code for retrieving a first and second timestamp, a first and second accumulator value, information representing digests, and for validating data by comparing the second accumulator value with a hash of the first timestamp, the first accumulator value, and the information.

25 Claims, 9 Drawing Sheets

SECURE TIMESTAMPING

BACKGROUND

Many modern systems utilize timestamps for various reasons. A document management system, for example, may log various events related to the documents it manages, such as uploads, retrievals, modifications, deletions and the like. As another example, many modern systems log various user behavior, such as log in attempts and various other interactions with a system. Generally, various events taking place in connection with a computer system may be logged or otherwise associated with timestamps. In most contexts, however, there is a lack of assurance that timestamps are accurate. A person with access to a system (whether the access is authorized or not) may, for instance, may often modify timestamps without detection of the modification. In other instances, programming mistakes may cause unintended modification to timestamps. While such timestamp modifications are often of little consequence, in some contexts, inaccurate timestamps can have significant adverse effects. As an example, legal proceedings may rely on the ability to accurately determine the time of an occurrence of an event and/or whether a document existed at a given time. However, the trustworthiness of the timestamping is only as strong as the security features preventing the timestamp from being tampered with or forged.

BRIEF DESCRIPTION OF THE DRAWINGS

Various embodiments in accordance with the present disclosure will be described with reference to the drawings, in which.

DETAILED DESCRIPTION

Figure 1:
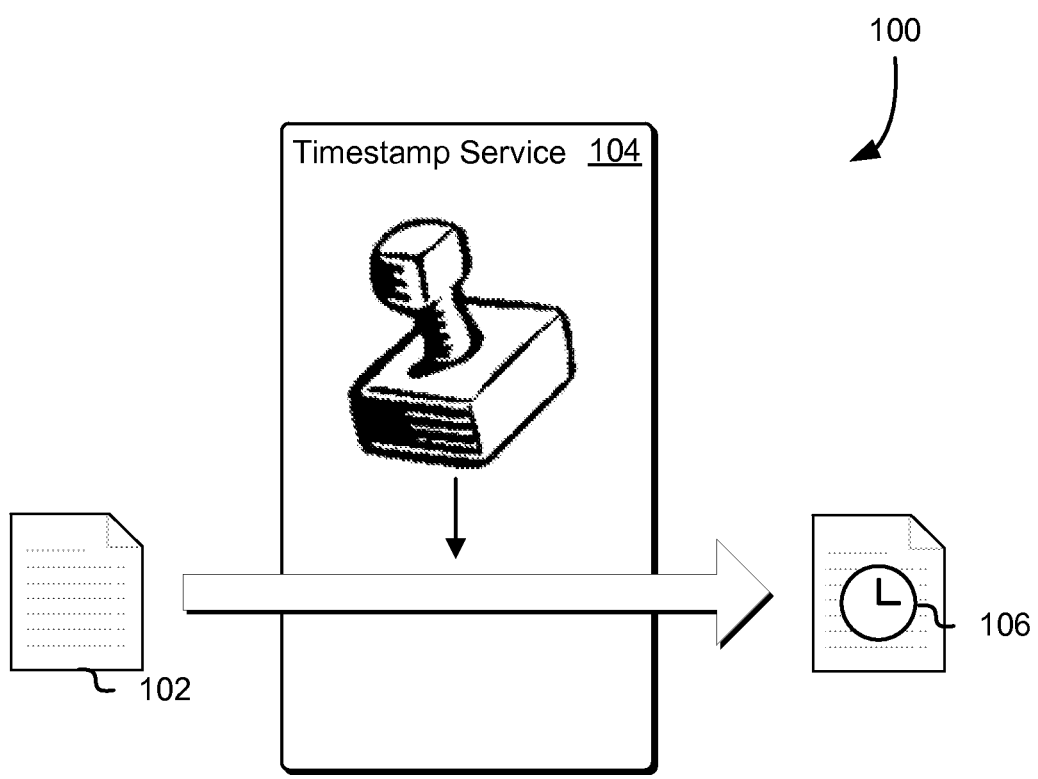
FIG. 1 illustrates an example of a document being timestamped by a timestamp service.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include a method for providing a fast, cryptographically secure timestamp for database logging and data timestamping. The method further includes associating a digital signature with data and a timestamp. The digital signature may be a cryptographically derived value generated with a secret private key. Associating the digital signature with the data and the timestamp provides further assurance that the data and timestamp have not been modified or forged, and further, if the asymmetric key that is used to sign logs is revoked, the signatures used before revocation still provide assurance that the data and timestamp was not tampered with. Techniques described and suggested herein further include a method for quickly, easily, and accurately verifying the secure timestamp.

As noted, various users may have a need for accurate timestamps. Techniques of the present disclosure include systems that implement a timestamping service for data. For example, a lawyer may have a need to have an electronic version of a document or photo timestamped and further have a need to provide evidence that neither the document nor the timestamp has been modified or forged. Likewise, a data center may maintain timestamps and logs of various accesses to databases and files maintained by the data center, and the data center may have a need to provide proof of when an entry was made and that the entry and the timestamp was not forged or modified. Note that, while timestamps are used throughout for the purpose of illustration, the scope of the present disclosure is not limited to time and a timestamping service. In particular, techniques of the present disclosure described herein are adaptable to various types of sequentially updated logging. Example applications may include, but are not limited to, cases where timestamps are being logged, cases where submitted data or digests are assigned an incremented auto-number value, and cases where submitted data or digests are assigned one or more other corresponding field values.

A timestamping service may be provided by a time stamping authority (TSA). A digest, as used herein, is a hash value produced from passing data (i.e., a message) through a cryptographic hash function. The term, "hash," as used in this disclosure is presumed to be a cryptographically strong hash, meaning that it is computationally infeasible to decrypt and/or forge, and of negligible probability that two distinct values can be computed or found such that the hash of one distinct value may equal a hash of another distinct value. The TSA acts as a virtual notary, wherein a user may submit data or a digest to the TSA, wherein the TSA associates a timestamp with the digest of the data and keeps a record of the timestamps and submissions.

In at least one embodiment of the present disclosure, there may be two tables, hereinafter referred to as timestamp table and documents table. Each table may contain at least two fields, or key-pairs, one field being a hash value (i.e., a digest) and another field being a timestamp. The timestamp table may be used to keep track of windows of time (interval window). The timestamp field of the timestamp table may contain a timestamp representing when the previous window ended and the new window began. The hash field of the hash key pair may contain an accumulator value. In some embodiments, a Bloom filter is used to quickly and compactly prove that a document or data (hereinafter, "document") is present within the interval window; for example, the Bloom filter may be stored in the timestamp table as a separate field, stored in memory, stored on persistent storage, or at least a portion of the accumulator value may be comprised of the Bloom filter.

The documents table may be used to keep track of documents or digests of documents for which a user or service requests to be timestamped. The digest field of the documents table may contain a digest (i.e., hash value) of a document and the timestamp field of the documents table contains a timestamp representing the time at which the digest was inserted into the documents table. The accumulator field of the timestamp table may contain a hash of the previous time, the previous accumulator value, and the digests that were stored in the documents table during the interval window. By including the previous time and previous accumulator value in the hash generated for current accumulator field, the accumulator fields of the timestamp table may comprise a sequence of values derived through successive application of a hash function, known as a hash chain. An advantage of having at least a portion of the accumulator value being a member of a hash chain is that an accumulator value in the sequence may not be compromised without an attacker having access to all previous accumulator values or invalidating other timestamp data. The initial value of the accumulator field may be any seed value. In one example, the initial value of the accumulator may be a hash of the current timestamp.

An interval window rolls when the current interval ends and the next interval begins. The process of rolling an interval window includes inserting a new timestamp with the current time, and may include a concurrent insertion of an accumulator value, into the timestamp table. The insertion indicates that the previous interval window ended and a new interval window began at the time indicated by that timestamp. The timestamp may be any valid measure of time at a precision as desired by the users or administrators of the system. An example of a timestamp could be a value reflecting a 64-bit datetime measured by the number of microseconds from Jan. 1, 1970 coordinated universal time or some other historical temporal reference point.

The interval window may be rolled according to an interval, that is, a fixed length of time, such every as ten seconds. However, the interval of the interval window may be any value, and may comprise a multiple of the precision of the timestamp measurement. The smaller the interval window, however, the more frequently timestamp services may be adding entries to the timestamp table and the documents table. Therefore, the interval window may be of a duration that balances precision with storage and performance. In at least one embodiment, the rolling may not occur according to fixed time intervals, but rolling may occur whenever the number of digests stored in the documents table during the present interval window exceeds a predetermined threshold. In at least another embodiment, the rolling may be a fixed time interval by default, but the interval window may be rolled on demand by a user or service of a computer resource services provider. As another embodiment usable in combination with other embodiments, the interval window may be rolled when the number of digests in a Bloom filter, as described below, exceeds a threshold. As still another embodiment usable in combination with other embodiments, the interval may be rolled based on one or more attributes within the document or data submitted for timestamping. As a further embodiment, usable in combination with other embodiments, the interval may be rolled according to information associated with an event stream. An example of this embodiment may include, but not be limited to, a situation where audit logs are being timestamped, wherein important and critical security events may trigger a finer-grained (i.e., narrower) interval window versus informational and low-severity messages may be timestamped over a coarser-grained (i.e., wider) interval window.

For example, in an initial state, the accumulator $d_0$ may be set to the result of a hash function of timestamp $\tau_0$ as follows:

$$\tau = \tau_0$$

$$d = d_0 = H(\tau_0)$$

Wherein H( ), as used herein, identifies a hash function that produces a cryptographically strong hash; i.e., it would be computationally infeasible to decode and negligible probability for H( ) to produce the same output for different input. When the initial interval window rolls, a new entry may be appended to the timestamp table as follows:

$$\tau = \tau_1$$

$$d = d_1 = H(\tau_0 \| d_0 \| \{digest_{0,0} \text{-} digest_{0,k}\})$$

Wherein $\tau_1$ is the new time, $d_1$ is the new accumulator value, and $\{digest_{0,0}\text{-}digest_{0,k}\}$ is the set of all k digests inserted into the documents table during the initial interval. Likewise, for each interval i succeeding the initial interval, a new entry may be appended to the timestamp table as follows:

$$\tau = \tau_i$$

$$d = d_i = H(\tau_{i-1} \| d_{i-1} \| \{digest_{i-1,0} \text{-} digest_{i-1,k}\})$$

Wherein $\tau_i$ is the next time, $d_i$ is the next accumulator value, $\tau_i$ is the previous time, $d_i$ is the previous accumulator value, and $\{digest_{i-1,0}\text{-}digest_{i-1,k}\}$ is the set of all k digests inserted into the documents table during the previous interval.

In at least one embodiment, the value of the accumulator field of the timestamp table may comprise a Bloom filter representing the digests of all documents received for timestamping within an interval window, rather than comprising the digests themselves. In at least another embodiment, the timestamp table may have a separate field for a Bloom filter representing the digests of all documents received for timestamping within an interval window. In this embodiment, the digests and timestamps may be logged in the documents table as previously disclosed, and the Bloom filter field of the timestamp table may be used for quickly checking whether the digest was stamped within the interval window without needing to rehash the full set of digests within the interval window. As another embodiment, usable in combination with other embodiments, the disclosed timestamp table and the documents table may actually be only one table with a timestamp field representing the start of the interval window, the accumulator field, and a Bloom filter field for representing the digests of all documents received for timestamping within an interval window. In this embodiment, the individual digests and corresponding timestamps may not be logged, but rather the Bloom filter provides assurance that the digest was timestamped within the interval window with high probability.

In an embodiment using a Bloom filter function, B( ), the Bloom filter is based at least in part on the provided document. For example, the Bloom filter may represent the digests received for timestamping within the interval window such that, as each new document digest, $digest_{NOW}$, is received, it may be added to the Bloom filter $b_{NOW}$ as follows:

$$b_{NOW} = b_{NOW} \| B(\text{digest}_{NOW})$$

Then, when the interval window rolls, new entries into the table may be added as follows:

$$\tau = \tau_i$$

$$d = d_i = H(\tau_{i-1} \| d_{i-1} \| b_{i-1})$$

Wherein, $b_{i-1}$ is the Bloom filter for the digests of the previous interval window. In an embodiment where the timestamp table has a third field for a Bloom filter, this value may be additionally added to the table as follows:

$$b = b_{NOW}$$

In this embodiment, a prior state may also be included in the Bloom filter. For example, the Bloom filter may include an additional hash of the previous Bloom filter for added security; i.e., to reduce the risk of an attacker modifying a document in such a way that it generates a digest designed to cause Bloom filter overload. For example:

$$\tau = \tau_i$$

$$b = b_{NOW} \| B(H(b_{i-1}))$$

$$d = d_i = H(\tau_{i-1} \| d_{i-1} \| b_{i-1})$$

In at least another embodiment, the Bloom filter field may be a field in a table other than the timestamp table. As another embodiment, usable in combination with other embodiments, one or more rainbow tables may be used instead of a Bloom filter to prove whether a digest is a member of a set of digests timestamped within a particular interval window without having the inherent lossiness of a Bloom filter.

A user or service may submit data or a digest of the data to the timestamp service for logging. Data may be submitted in various ways, including, but not limited to, by clicking an icon or form element on a web page of a computing resource service provider or by a programmatic call to an API. The data may be in a variety of electronic formats, including, but not limited to, formats such as a text file, an encrypted file, a bitmapped image, and an audio recording. Upon receipt, the timestamp service may insert the digest of the data into the documents table into the digest field and the timestamp field is inserted with the current time. Depending on the embodiment, the digest of the data may be the result of a cryptographic hash function performed by the timestamp service, performed by a different service, or performed by the user or service submitting the data and the timestamp service does not received the unhashed data. A document may be submitted for timestamping multiple times, producing identical digests for insertion. In such a case, there may be multiple timestamps associated with a particular document digest value. In at least one embodiment, the user may receive a notification that the digest was successfully inserted. In at least another embodiment, the user may receive, as a receipt, a combined hash of the interval timestamp, the previous accumulator state, and the set of digests logged within the interval window. As another embodiment, usable in combination with other embodiments, the receipt is further signed with a digital signature as verification that the digest of the data was properly timestamped.

In at least one embodiment, a Bloom filter is used to encode the set of digests being inserted into the documents table during each accumulator round (i.e., the interval window), and the Bloom filter and interval window timestamp is inserted into the documents table rather than inserting each digest with a timestamp. In at least another embodiment, the documents table and timestamp table are actually a single table with a Bloom filter entry which is an encoding of the set of digests being inserted each time the interval changes, rather than inserting each digest with a corresponding timestamp. As another embodiment usable in combination with other embodiments, the user may receive, as a receipt, a combined hash of the interval timestamp, the previous accumulator state, and the Bloom filter of the digests received within the interval window. In at least another embodiment, the receipt is further signed with a digital signature.

To prove that a document was created at a certain time, the document may be hashed to produce a document digest. The documents table may be queried to retrieve the timestamp, $\tau_{NOW}$, associated with the document digest, $\text{digest}_{NOW}$. In one example, the timestamp associated with the $\text{digest}_{NOW}$ is the earliest (i.e., first) timestamp associated with that document digest. In at least another embodiment, the documents table may be queried to retrieve the most recent timestamp associated with that document digest. In this embodiment, the timestamp may be used to determine the last time the document was timestamped before it changed. In at least another embodiment, the documents table may be queried to retrieve all timestamps associated with that document digest. In this embodiment, the timestamps may be used to validate all the times that particular version of the document was timestamped. As another embodiment, usable in combination with other embodiments, the user requests to validate that the document has a particular itemstamp.

Once $\tau_{NOW}$ has been retrieved, the timestamp table may be queried to determine the timestamps defining the interval window, $\tau_i$ and $\tau_{i+1}$, during which $\text{digest}_{NOW}$ was stamped. The hash keys, $d_i$ and $d_{i-1}$, associated with $\tau_i$ and $\tau_{i+1}$ may also be retrieved from the timestamp table. With knowledge of $\tau_i$ and $\tau_{i+1}$, the set of all digests, $\{\text{digest}_{i,0}\text{-digest}_{i,k}\}$, logged into the documents table during the interval window between $\tau_i$ and $\tau_{i+1}$ may be retrieved from the documents table.

To prove that $\text{digest}_{NOW}$ was timestamped at time $\tau_{NOW}$, and that neither the document nor the timestamp has been modified or forged, a hash of $\tau_i$, $d_i$, and $\{\text{digest}_{i,0}\text{-digest}_{i,k}\}$ must match $d_{i-1}$. That is, if $d_{i-1} H(\tau_i \| d_i \| \{\text{digest}_{i,0}\text{-digest}_{i,k}\})$, then validation is successful, indicating that the document was timestamped within the interval window defined by, $\tau_i$ and $\tau_{i+1}$, and is therefore not likely to have been modified or forged. However, if validation was unsuccessful, then tampering has likely occurred. For example, in at least one embodiment, a user may request assurances that a previously-submitted timestamp has a valid timestamp, and the system responds with a validation result (e.g., success/failure). In at least another embodiment, a user may submit a previously-submitted document and a timestamp, wherein the system responds with a validation that the submitted timestamp matches a validated timestamp stored within the system. As another embodiment, usable in combination with other embodiments, a user may request a timestamp for a previously-submitted document and the timestamp server returns one or more timestamps corresponding to the one or more submissions of the version of the document for timestamping, and further returns a validation result for each timestamp.

In at least one embodiment, verification that the receipt contained a proper digital signature provides adequate verification that the digest was properly timestamped. In at least another embodiment, verification is provided by checking the digest against a Bloom filter. As another embodiment, usable in combination with other embodiments, the system may further walk through the chained accumulator values in the timestamp table to ensure that the accumulator has not been tampered with. As still another embodiment, usable in combination with other embodiments, the system performs verification on every digest logged within the same interval window as the interval window in which the digest being checked against was logged. In an alternate embodiment, usable with other embodiments described herein, user may specify the degree of certainty desired for the validation and the system adjusts the type and amount of validation performed according to the requested degree.

In one example, the timestamp server's digital signature key is logged into the timestamp table each time the interval window is rolled. In a case where the private key of the digital signature is published, the digital signatures, the digital signatures associated with the timestamp and accumulator values before the publication may still be considered valid. In another example, the digital signature key is regenerated whenever an event occurs that indicates that the key may have been compromised. In still another example, each interval window has its own individual digital signature key which is logged in the timestamp table each time the interval window is rolled.

In at least one embodiment, the intervals between the timestamping windows (i.e., when the interval window is rolled) may be a fixed amount of time. An example of this embodiment includes, but is not limited to where a new timestamp and hash value is logged to the timestamp table every ten seconds. Any fixed time interval is possible. In at least another embodiment, the rolling of the interval window may be performed according to random intervals. As another embodiment, usable in combination with other embodiments, rolling of the interval window may be determined by a threshold number of digests inserted into the documents table during that interval window. An example of this embodiment includes, but is not limited to, where a new timestamp and hash value is logged to the timestamp table whenever five digest entries are made to the documents table since the interval window started. In at least another embodiment, a user, perhaps in exchange for a fee, may request smaller time increments for the interval between timestamping windows. As still another embodiment usable in combination with other embodiments, a user, perhaps in exchange for a fee, may be enabled to force the rolling of the interval window, thereby triggering the next timestamp and hash value update to the timestamp table, on demand. In such an embodiment, the user may make a call to an application programming interface (API), which rolls the interval window by causing the current interval window to end and a new interval window to begin by entering a new timestamp and hash value into the timestamp table. Yet another embodiment, usable in combination with other embodiments, the interval window may be rolled when the number of digests in the Bloom filter exceeds a threshold. In still another embodiment usable in combination with other embodiments, a user, perhaps in exchange for a fee, a user may be enabled to create an interval window exclusive for timestamping of the user's digest. In this embodiment, the user may submit a request to timestamp the user's data or digest, whereupon the current interval window is rolled, and the user's digest is logged into the documents table, and the interval window is rolled again immediately thereafter; in this embodiment, only the user's digest is the sole digest logged within that particular interval window. As another embodiment, usable in combination with other embodiments, the interval window may be rolled when there are indications that the validity of a timestamp may have been compromised.

In at least one embodiment, for the verification proof, the accumulator may be hash block aligned such that the internal hash state reflects the earlier hash states of the accumulator, and the amount of data necessary to exhibit in the final state may be partially shortened thereby. In this embodiment, hash prefix reduction may be used to only show the internal state of the hash function being processed for all predecessors, for example, by returning an intermediate hash of the hash transform.

FIG. 1 illustrates an aspect of an environment 100 in which an embodiment of the present disclosure may be practiced. As illustrated in FIG. 1, the environment 100 may include a document 102 that is provided to a timestamp service 104, whereupon it receives a corresponding timestamp 106. The document 102 may be any electronic format, including, but not limited to, formats such as a text file, an encrypted file, a bitmapped image, an audio recording, or a cryptographic hash value. The document 102 may or may not be passed through a cryptographic hash function prior to being provided to the timestamp service 104. The document 102 may be provided to a timestamp service 104 to have the document recorded with a corresponding "stamp" of the current date and time. The timestamp service 104 may be a service running in software or hardware, and the timestamp service may be executed on any suitable electronic device, such as a dedicated timestamp server, a distributed computing system, a portable computing device, a computing resource service provider, or an electronic computing device similar to electronic computing device 902 described in FIG. 9.

The timestamp 106 provided by the timestamp service may be an entry into a database table associating the contents of the document with a value representing the current date and time to a sufficient precision and accuracy. For example, the value may be a 64-bit datetime value that measures the number of microseconds from Jan. 1, 1970 coordinated universal time. The timestamp service 102 may or may not provide notification response to the entity submitting the document 102 to the timestamp service 104. Examples of a notification response include, but are not limited to, an acknowledgement of receipt and successful timestamp of the document 102, a response with at least a portion of the present or previous accumulator value, a response including a message and a digital signature, and a response including a Bloom filter of the digests submitted during a timestamp interval, the timestamp interval and accumulator values being described in further detail below.

Figure 2:
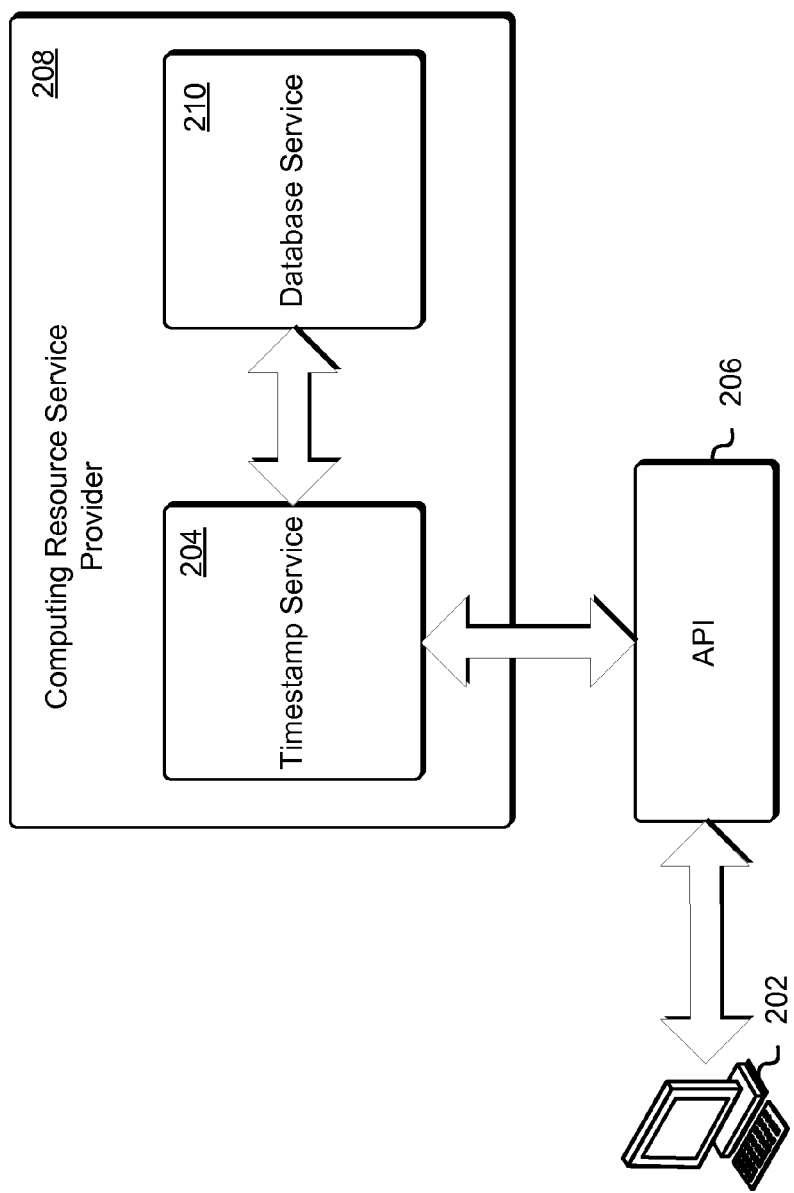
FIG. 2 illustrates an example of a client communicating to a timestamp service through an application programming interface.

FIG. 2 illustrates an aspect of an environment 200 in which an embodiment of the present disclosure may be practiced. As illustrated in FIG. 2, the environment 200 may include a computing device 202 communicating with a timestamp service 204 through an API 206, the timestamp service 204 hosted by a computing resource provider 208 and further interfacing with a database service 210, which may also be hosted by the computing resource provider 208. The computing device 202 may be any suitable computing device, including but not limited to a computing devices such as a cellular phone, a distributed computing system in a data center, or an electronic computing device similar to electronic computing device 902 described in FIG. 9.

The timestamp service 204 may comprise software instructions executing on one or more computing devices, the one or more computing devices connecting to the computing device 202 through a communication channel, such as a physical local area network, wide area network, wireless network, Internet, or other manner of communication between computing devices. The computing device 202 may access the timestamp service 204 by making a call to the API 206. The API 206 may comprise a set of functions, routines, protocols, or procedural libraries for accomplishing the task of interacting with the timestamp service 204. The API 206 may provide an interface between users and the timestamp service 204 and at least ensure that users have appropriate credentials required for the requested action by the timestamp service.

The computing resource service provider 208 may be a computing resource service provider similar to computing resource service provider 102 in FIG. 1, and may host one or more services, APIs and databases, such as the timestamp service 204, the API 206, and the database service 210. The timestamp service 204 may further communicate with the database service 210, which may be hosted on the same or different computing device as the timestamp service 204. The database service 210 may further be hosted on one or more computing devices, such as a distributing computing system. The database service 210 in the environment 200 may be used to host, maintain and provide the means for inserting, updating, and retrieving records from database tables for a database described herein. The database serviced by the database service 210 may be any type of database, including a scalable database, such as a NOSQL database or a key-value store.

Figure 3:
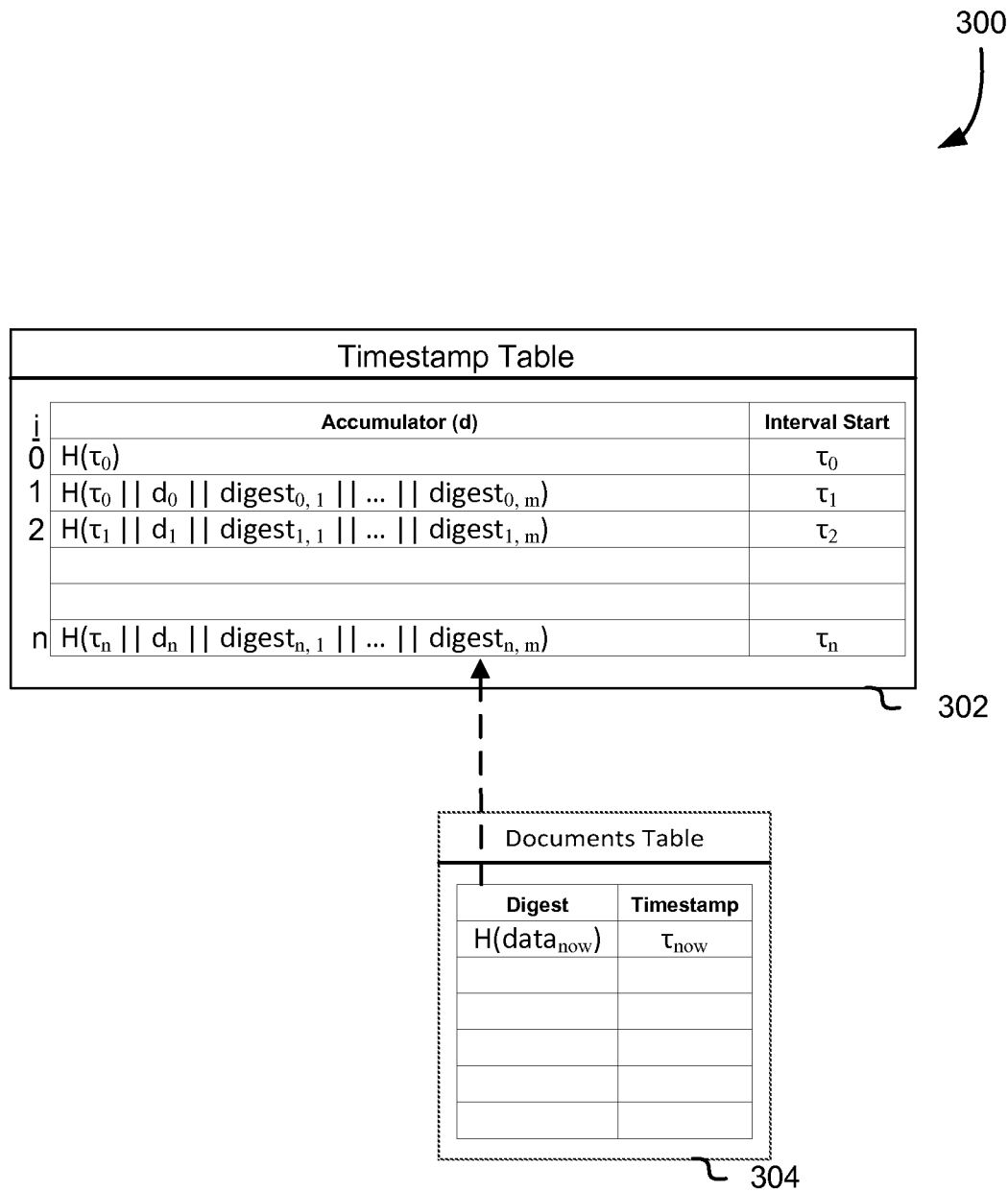
FIG. 3 illustrates an example of a timestamp table and its relationship with a documents table in accordance with at least one embodiment.

FIG. 3 illustrates an aspect of an environment 300 in which an embodiment of the present disclosure may be practiced. As illustrated in FIG. 3, the environment 300 may include a table with a hash key pair of an accumulator and a timestamp, such as timestamp table 302, and a table with a hash key pair of a digest and a timestamp, such as documents table 304. The timestamp table 402 and the documents table 304 may be hosted by any database or file structure supporting hash key pairs, including a scalable database service, such as NoSQL, the database service 210 of FIG. 2 and/or a data store similar to the data store 910 discussed in connection with FIG. 9. In the environment 300, the timestamp table 302 may define interval windows during which digests are timestamped. The accumulator field may be used to keep track of a state of a one-way membership function. A one-way membership function, as used herein, is a one-way function (i.e., a function that may not be computationally difficult to compute for a current value, but may not be computationally trivial to determine a previous value from the current value), having a recurrence relationship to a previous value of the function. The one-way membership function may not be mathematically proven/proveable as one-way, but have computational complexity properties that render the function pre-image resistant. Effectively one-way functions include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

In timestamp table 302, the initial row may be comprised of a timestamp $\tau_0$ at time zero (i.e., representing the start time of the initial interval window (i.e., at i=0) in the interval start field and a seed value of a hash of the timestamp $\tau_0$ in the accumulator field. As shown, the next row may be comprised of a timestamp $\tau_1$, simultaneously representing the end of the initial interval window and the start of the next interval window (i.e., at i=1) in the interval start field, and a hash of the previous timestamp $\tau_0$, the previous accumulator value $d_0$, and the digests collected during the initial interval window (i.e., $digest_{0,1}$-$digest_{0,m}$). The digests collected during an interval window may be retrieved from the documents table 304, or may be held in a memory of the one or more computing devices hosting the database service 210 of FIG. 2 and/or a data store similar to the data store 910 discussed in connection with FIG. 9 910 discussed in connection with FIG. 9. In at least one embodiment, the accumulator may comprise hashes based on a Bloom filter rather than the digests.

Figure 4:
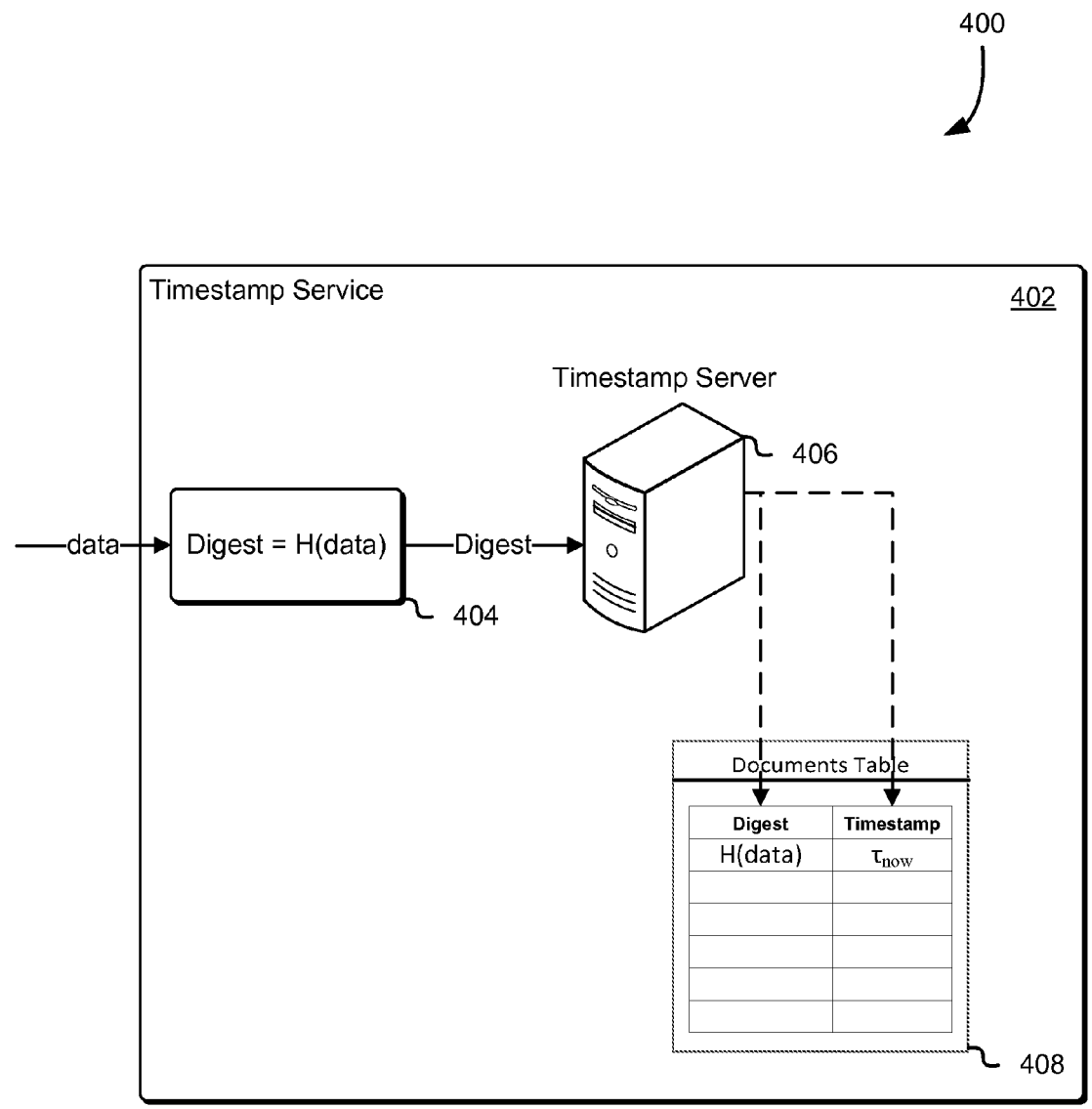
FIG. 4 illustrates an example of a timestamp server, a documents table, and an effect of a request to timestamp a document in accordance with at least one embodiment.

The documents table 304 may be updated with digests of data $H(data_{NOW})$ and a timestamp $\tau_{NOW}$ as requested by clients, described in further detail in FIG. 4. Each subsequent time the interval window is rolled, entries into the timestamp table 302 are made similar to the next interval window described above. For example, the next row may be comprised of a timestamp $\tau_2$, simultaneously representing the end of the initial interval window and the start of the next interval window (i.e., at i=2) in the interval start field, and a hash of the previous timestamp $\tau_1$, the previous accumulator value $d_1$, and the digests collected during the initial interval window (i.e., $digest_{1,1}$-$digest_{1,m}$). Further details on the process of updating the timestamp table may be found in the description of FIG. 5.

FIG. 4 illustrates an aspect of an environment 400 in which an embodiment of the present disclosure may be practiced. As illustrated in FIG. 4, the environment 400 may include a timestamp service 402 with a cryptographic hash function 404 for generating a hash of digital data, which is subsequently assigned a by a timestamp server 406 and stored in a table, hereinafter referred to as documents table 408, having a hash key pair. The timestamp service 402 may be a service executing on a timestamp server 406 under the control of a computing resource service provider such as the computing resource service provider 802 of FIG. 1. The interval window may be rolled, as in the examples illustrated in FIG. 3 and FIG. 5, by the timestamp service 402, or a different service may be responsible for rolling the interval window. Likewise, the data validation may be performed, as in the example illustrated by FIG. 7, by the timestamp service 402, or a different service may be responsible for the data validation. The environment 400 depicts an example aspect of the timestamp service 402 being used to timestamp data.

As illustrated, the timestamp service 402 receives data from a source. Examples of a source include, but are not limited to, a user, an application or service executing on one or more computing devices, or an application or service executing on the timestamp server 406. The timestamp service 402 may pass the data through a cryptographic hash function 404 to produce a digest. However, it may be that the source provides a valid digest of the data, whereupon the cryptographic hash function 404 may not be needed, and the digest may pass directly to the timestamp server 406.

Upon receipt of the digest, the timestamp server inserts the digest into the documents table 408 along with a timestamp representing the current time $\tau_{NOW}$. The timestamp server 406 may be any suitable system such as web server 906 and/or application server 908 discussed in connection with FIG. 9. The documents table 408 may be the same or similar table as the documents table 304 of FIG. 4, and may be hosted by any database or file structure supporting hash key pairs, including a scalable database service, such as NoSQL, the database service 210 of FIG. 2 and/or a data store similar to the data store 910 discussed in connection with FIG. 9.

In at least one embodiment, a user, service, or resource may have its own dedicated documents table 408. In at least another embodiment, the documents table 408 may be shared by and may accept digests of data and corresponding timestamps from various different sources. In at least one embodiment, the hash value field accepts a Bloom filter representing a set of digests stamped during the interval window, rather than the individual digests, and the timestamp field represents the start time of the interval window. Further details on the process of timestamping data may be found in the description of FIG. 6.

Figure 5:
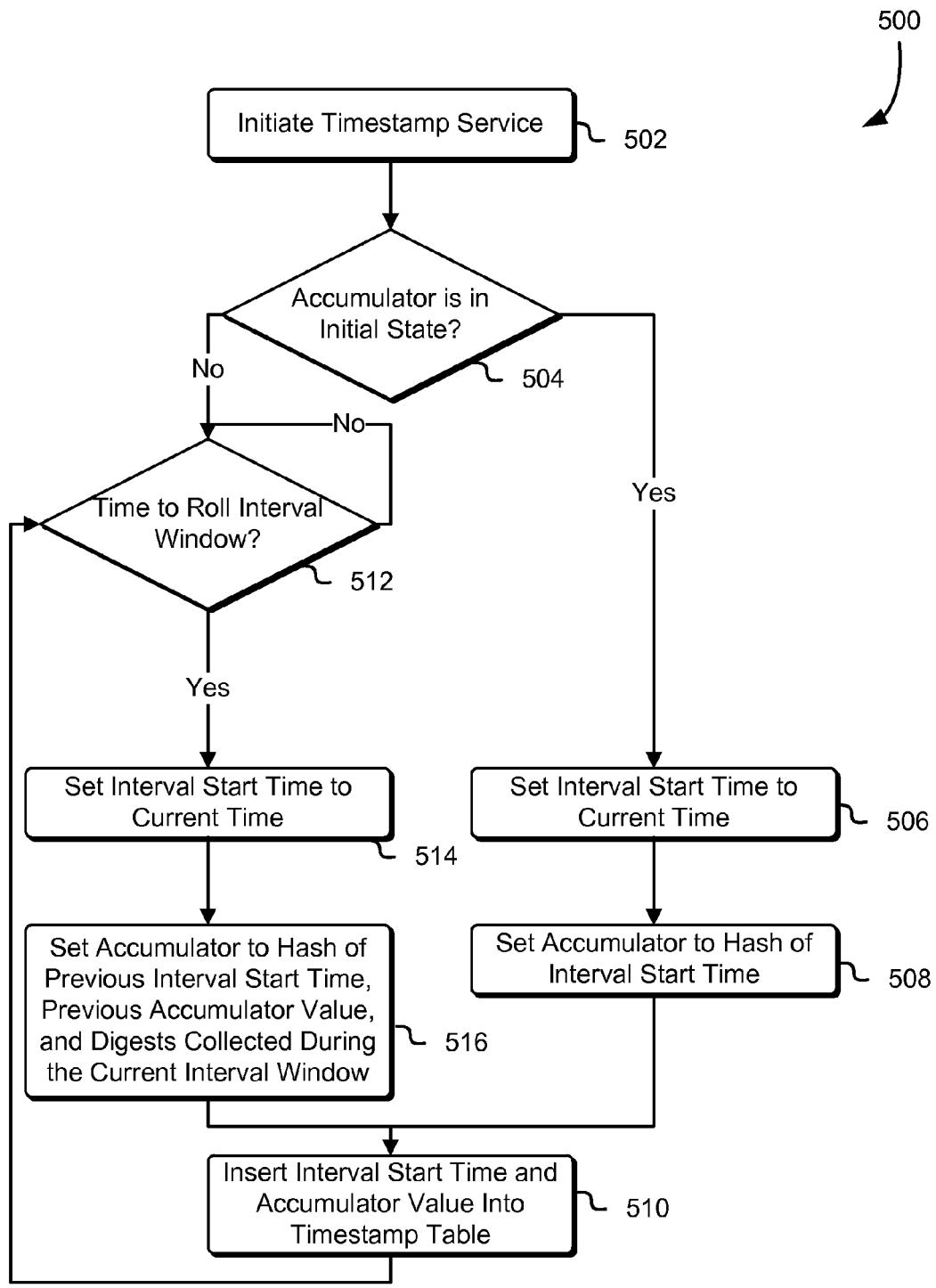
FIG. 5 is a flow chart that illustrates an example process of rolling an interval window in accordance with at least one embodiment.

FIG. 5 is a flow chart illustrating an example of a process 500 for rolling an interval window in accordance with various embodiments. The process 500 may be performed by any suitable system such as web server 906 and/or application server 908 discussed in connection with FIG. 9. The process 500 includes a series of operations wherein a timestamp and an accumulator value associated with an interval window may be inserted into a database, such as a data store similar to the data store 910 discussed in connection with FIG. 9. In 502, a service, hereinafter referred to as a timestamp service, responsible for inserting the interval start time and accumulator value into a table, hereinafter referred to as a timestamp table, of the database is started. The timestamp table may be a table with a hash key pair; that is, the timestamp table may comprise at least two fields, a first field being an accumulator field for containing a hash value, and a second field being a timestamp field for containing an interval start time value. The interval start time may be any valid representation of a date and time to a desired precision. An example of a timestamp field includes, but is not limited to, a timestamp field configured to accept a 64-bit datetime value that measures the number of microseconds from Jan. 1, 1970 coordinated universal time.

In 504, the device performing the process 500 determines whether the accumulator may be in an initial state; the accumulator may be in an initial state if no previous value for the accumulator is present within the associated field of the timestamp table. The accumulator may additionally be considered to be in an initial state for various reasons, including, but not limited to, that the previous accumulator value may have been compromised, forged, or corrupted. If the accumulator is in an initial state, the device performing the process 500 proceeds to 506, wherein the current time, as measured at a desired precision, is set to be the interval start time value.

In 508, the initial accumulator value is seeded to be a hash of the interval start time value. However, the initial accumulator value may be set to any value, including, but not limited to, some random value. In 510, the initial accumulator value and the interval start time value are inserted into the timestamp table. The insertion of the initial accumulator value and the interval start time value indicates that the initial interval window has started at the time specified by the interval start time value. After the insertion of the initial accumulator value and the interval start time value into the timestamp table, the device performing the process 500 proceeds to 512, wherein the device waits until it is time to roll an interval window.

In 512, the device performing the process 500 waits until it is time to roll the current interval window. As noted herein, examples of events triggering the roll of an interval window include, but are not limited to, rolling the interval according to a fixed interval, a random interval, according to reaching a threshold number of digests having been timestamped, according to exceeding a threshold size for a Bloom filter, an indication that the validity of a timestamp has been compromised, on a demand from a client, or according to the billing structure of a client utilizing the timestamp service. When it becomes time to roll the interval window, the device performing the process 500 proceeds to 514, where, similar to 506, wherein the current time, as measured at a desired precision, is set to be the interval start time value.

In 516, a new accumulator value is generated. The accumulator value may be based at least in part on digests submitted during the interval window. The accumulator value may be further based at least in part on a previous accumulator value, however the accumulator value may be further based on any value, including, but not limited to, the timestamps corresponding to the digests submitted during the interval window, a random value, a hash of the interval start time value, or some other value. The digests submitted during the interval window may each be a portion of a hash key pair with a corresponding timestamp as the other portion, and, as noted, the corresponding timestamp may be additionally included in the hash when calculating the accumulator value. The digests submitted during the interval window may be retrieved from persistent or non-persistent storage similar to the one or more storage devices disclosed within the description of FIG. 9, such as from random access memory or from a database stored on one or more hard drives.

The operation depicted by step 516 generates a new accumulator value by generating a hash of the previous interval start time, the previous accumulator value, and the digests collected during the current interval window. An advantage of basing the accumulator value at least in part on the hash key pair of the start of the previous interval window is that updating the accumulator in this way may make it more difficult to modify or forge the accumulator value without having access to all previous accumulator values and interval start time values and/or without invalidating previous other timestamping actions. By including the digests collected during the current interval window in the hash that generates the accumulator value, the determination of whether a particular digest was or was not timestamped within the interval window can be made by analyzing the accumulator value. Note that, depending on the particular embodiment and how the roll of the interval window is triggered, the interval window may role without collecting any digests during the interval window. In such a case, the new accumulator value may be calculated without including digests or may be calculated with a random, fixed, or other value in place of the digests. Likewise, in some instances, only one digest may be collected during the interval window, such as in the embodiment where the user may submit a request to timestamp the user's data or digest, whereupon the current interval window is rolled, the user's digest is logged into the documents table, and the interval window is rolled again immediately thereafter. In other instances, the digests may comprise two or more digests collected during the interval window.

After the accumulator value is generated, the device performing the process 500 proceeds once again to 510, wherein the generated accumulator value and the interval start time value are inserted into the timestamp table. The insertion of the generated accumulator value and the interval start time value indicates that the previous interval window has rolled and a new interval window has begun at the time specified by the interval start time value.

Figure 6:
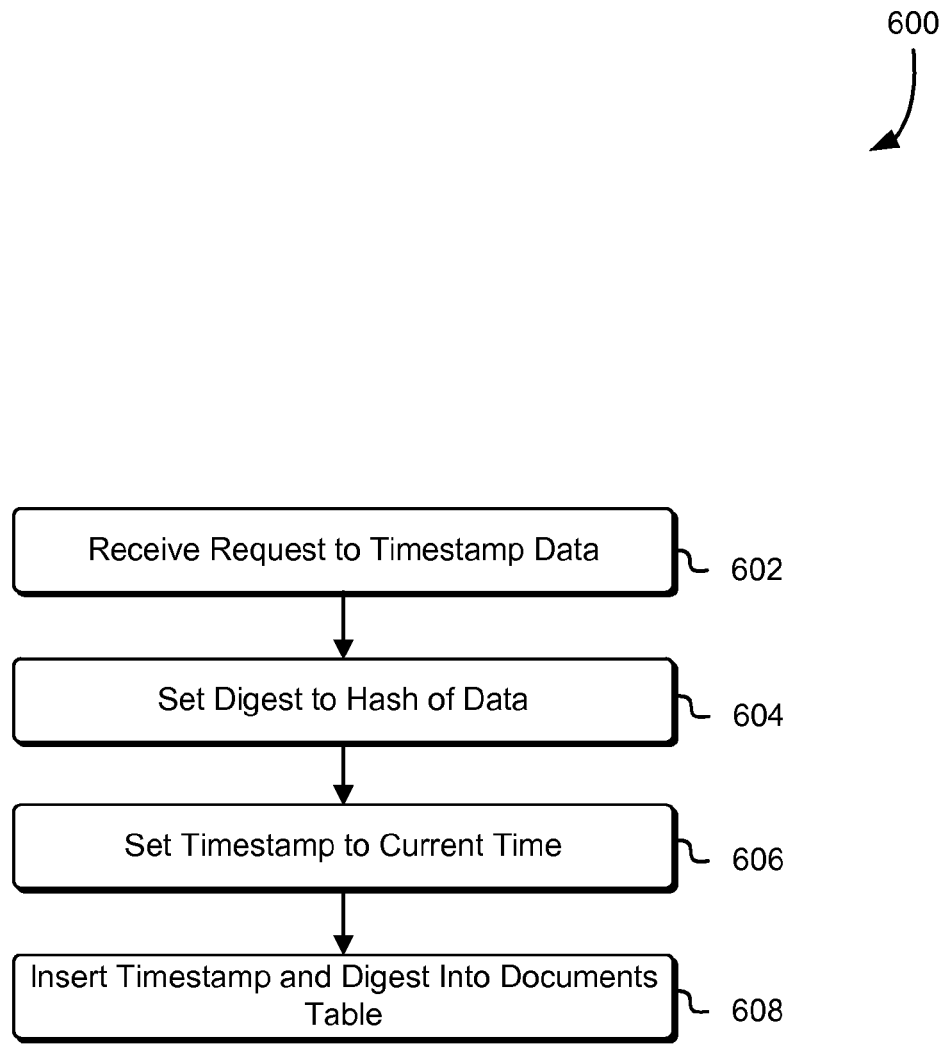
FIG. 6 is a block diagram that illustrates an example process of timestamping in response to a request to timestamp data in accordance with at least one embodiment.

FIG. 6 is a block diagram illustrating an example of a process 600 for timestamping data in accordance with various embodiments. The process 600 may be performed by any suitable system such as web server 906 and/or application server 908 discussed in connection with FIG. 9. The process 600 includes a series of operations wherein a request to timestamp data results in a timestamp corresponding to the data being inserted into a table, hereinafter referred to as a documents table, of a database such as a data store similar to the data store 910 discussed in connection with FIG. 9. Note that the operations being performed in process 600 may be performed separately by one or more devices, and may be performed in various orders, including in parallel. In 602, the device performing the process 600 may receive a request to timestamp the data. In some examples, the request to timestamp data may be received from a service executing on a server, for example the service may be a service requesting to timestamp log entries. In such an example, the server may be an individual server, one or more servers running in a data center or distributed network, or may be a server hosted by a virtual computer system service similar to the virtual computer system service 808 described in FIG. 8. In other examples, the request to timestamp data may be received from one or more users or services of the computing resource service provider, similar to the computing resource service provider 802 described in FIG. 8, through an programmatic call to an API or other method.

In 604, the data corresponding to the request may be processed through a hash function to generate a digest of the data. Note that it is possible that the request to timestamp data may include the digest of the data rather than the data itself or the data may itself be a digest, the digest of the data being a digest of a valid format to be inserted into the documents table having been generated by the requestor or by a different device than the device performing the process 600. In either case, the digest value to be inserted is set to be the digest of the data. In 606, the timestamp value may be set to be the current time. In 608, the digest value and the timestamp value are inserted into the documents table.

In some cases, a data received for timestamping during an interval may not be fully processed until after the interval window rolls. In such a case, the rolling of the interval window may be undone and the interval window re-rolled to include the delayed data's digest in the accumulator hash. In another embodiment, the documents table may have a flag field for whether the digest is included in the accumulator value. In such an embodiment, the delayed digest's data may be flagged as not being in the present in the accumulator value of the timestamp table and, during the validation operations described in conjunction with 714 of FIG. 7, may be omitted from the digests retrieved from the documents table. In still another example, the digest of the data may be re-timestamped such that the timestamp falls within the current interval window.

Figure 7:
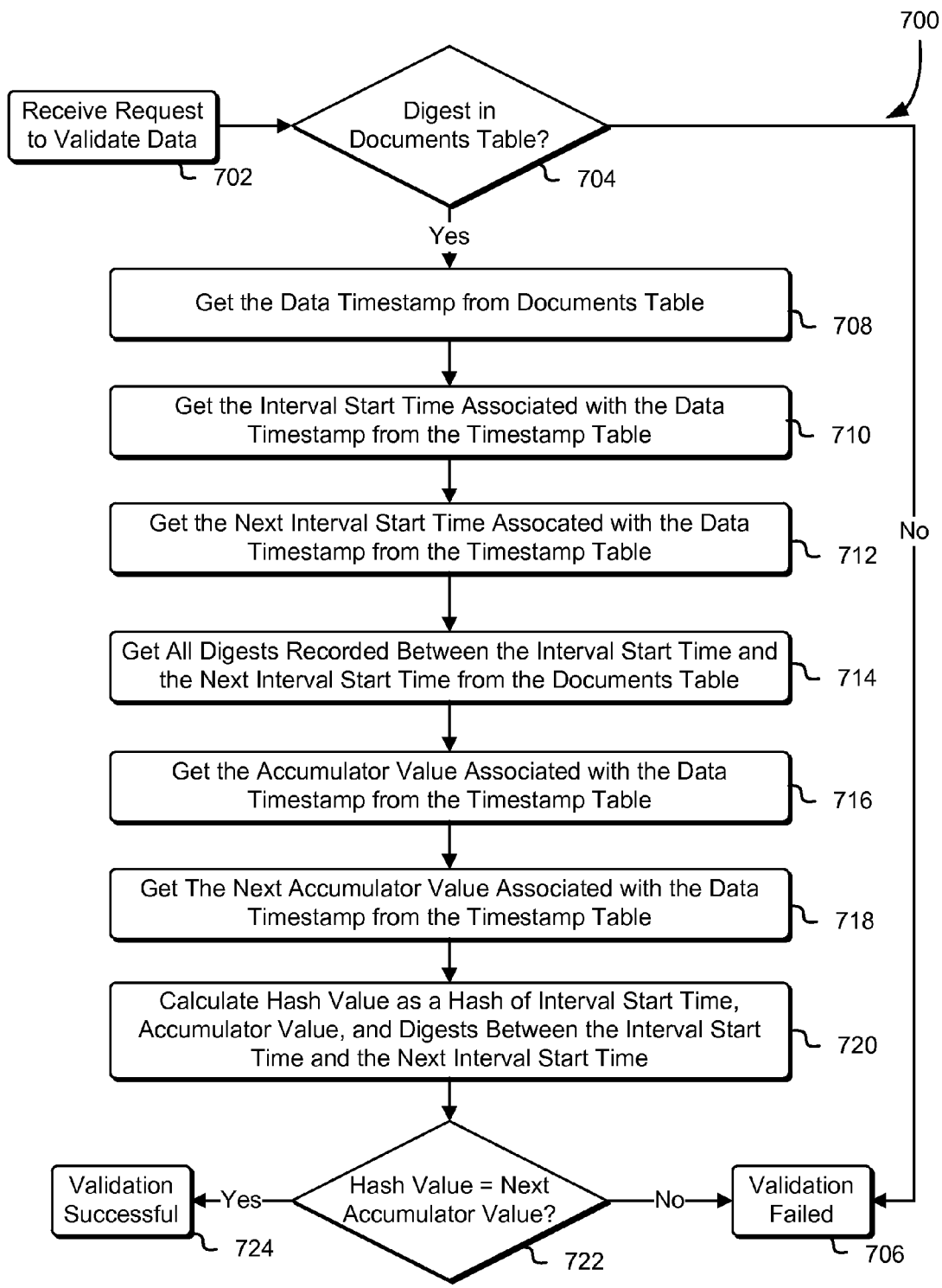
FIG. 7 is a flow chart that illustrates an example process of validating the timestamp of data in response to a request to validate data in accordance with at least one embodiment.

FIG. 7 is a flow chart illustrating an example of a process 700 for validating a data timestamp in accordance with various embodiments. The process 700 may be performed by any suitable system such as web server 906 and/or application server 908 discussed in connection with FIG. 9. The process 700 includes a series of operations wherein a device receives a request to validate data and the validation process determines whether the data has a valid timestamp. Note that the operations being performed in process 700 may be performed separately by one or more devices, and may be performed in various orders, including in parallel. In 702, the device performing the process 700 may receive a request to validate the timestamp of data. The data may be provided to the device in the form of a digest of the data, or as the data itself, in which case the device generates a digest of the data by processing the data through a hash function.

In 704, the device performing the process 700 may query a database table, hereinafter referred to as the documents table, for one or more timestamp values corresponding to the digest of the data to be validated. If no timestamp values corresponding to the digest of the data are present, this indicates that either the data corresponding to the digest was not previously timestamped by the timestamp service operating in a manner described regarding FIG. 6 or that the data has changed since the time it was previously timestamped. Thus, if no timestamp values corresponding to the digest of the data are present, the device performing the process 700 proceeds to 706, as the validation has failed. However, if one or more timestamp values corresponding to the digest of the data are present within the documents table, the device performing the process 700 proceeds to 708.

In 708, the one or more timestamp values corresponding to the digest of the data are retrieved. Depending on how many times the data may have been previously timestamped, one or more timestamp values may be retrieved. In at least one embodiment, the device performing the process 700 may select the timestamp value corresponding to the digest of the data with the earliest date/time. In this embodiment, the validation is performed for the earliest timestamp corresponding to the digest of the data; for example, a user may be interested in obtaining proof of when the document was first created or timestamp. In at least another embodiment, the device performing the process 700 may select the timestamp value corresponding to the digest of the data with the most recent date/time. In this embodiment, the user may be interested in obtaining proof of the last known time that the document was in a particular state. In at least another embodiment, the device performing the process 700 may select multiple timestamp values corresponding to the digest of the data. In this embodiment, the user may wish to validate multiple timestamps associated with the particular state of the data.

In 710, the table associated with maintaining the state of the interval windows, hereinafter referred to as timestamp table, may be queried to determine the accumulator values at the start time of the active interval window during the period when the digest was timestamped. An example of this query includes, but is not limited to, where, for each digest timestamp, a first record may be returned for a maximum interval window start time where the digest timestamp is greater than or equal to the interval window start time. In 712, the timestamp table may be queried to determine the accumulator values at the end time of the active interval window during the period when the digest was timestamped. An example of this query includes, but is not limited to, where, for each digest timestamp, a second record may be returned for a minimum interval window start time where the digest timestamp is less than the interval window start time. In these examples, the first record interval window start time and the second record interval window start time represents the start and end times for the interval window during which the digest of the data was timestamped.

In 714, the documents table may be queried to retrieve all digest values that were timestamped between the first interval window start time and the second interval window start time. Because the accumulator value of the interval windows in this example are based on digest values submitted during an interval window, these digest values may provide assurance that the timestamp data has not been forged or replaced.

In 716, the accumulator value from the timestamp table associated with the start of the interval window during which the digest of the data was timestamp may be retrieved. In the example described above for 710, this accumulator value would be the accumulator value associated with the first record retrieved. In 718, the accumulator value from the timestamp table associated with the start of the interval window associated with the interval window following the interval window during which the digest of the data was timestamped is retrieved. In the example described above for 712, this accumulator value would be the accumulator value associated with the second record retrieved. Note that operations performed in 708-718 may be cumulatively performed utilizing only one or more queries.

In 720, the interval window start time, the corresponding accumulator value, and the digest values timestamped during the interval window may be passed through a hash function. In the examples described above, the hash would be calculated based on the interval window start time of the first record retrieved in 710, the accumulator value of the first record retrieved in 716, and the digest values retrieved in 714.

In 722, the hash value obtained in 720 may be compared with the accumulator value obtained in step 718. If the hash value matches the accumulator value, the device performing the process 700 proceeds to 724, wherein the device indicates that the timestamp of the digest of the data has been successfully validated. Otherwise, the device performing the process 700 proceeds to 706, wherein the device indicates that the timestamp of the digest could not be validated, indicating that the data, digest, timestamp, or accumulator value may have been compromised, forged, or corrupted.

Figure 8:
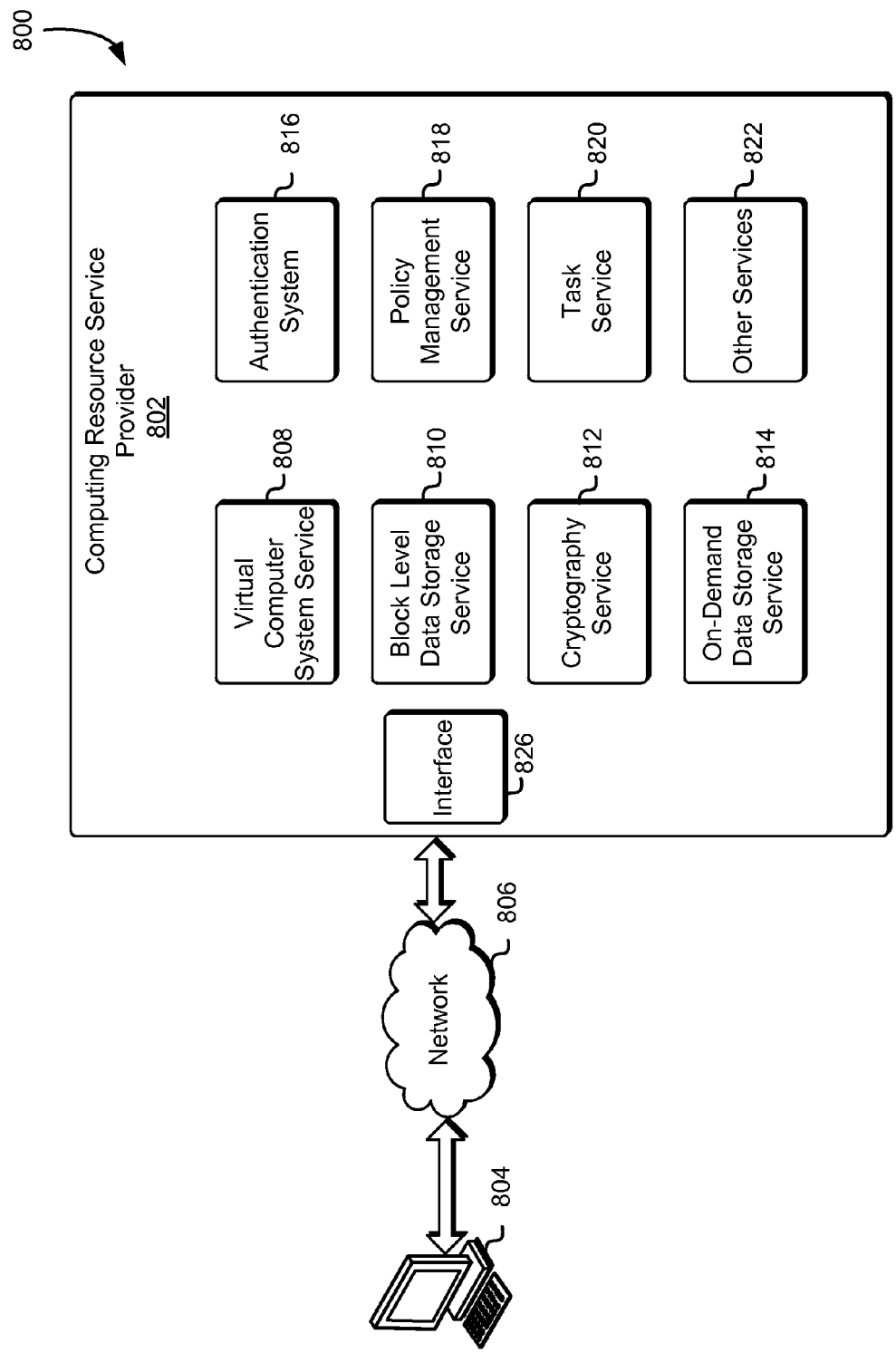
FIG. 8 illustrates an example of a customer connected to a computing resource service provider.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiment described herein or a variation thereof The computing resource service provider 802 may provide various computing resource services to its customers. The services provided by the computing resource service provider 802, in this example, include a virtual computer system service 808, a block-level data storage service 810, a cryptography service 812, an on-demand data storage service 814, an authentication system 816, a policy management service 818, a task service 820 and one or more other services 822. It is noted that not all embodiments described herein include the services 808-822 described with reference to FIG. 8 and additional services may be provided in addition to or as an alternative to services explicitly described herein. As described herein, each of the services 808-822 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 812 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, so as to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects which may be used by the customer 804 to retrieve or perform other operations in connection with the data objects stored by the on-demand data storage service 814.

As illustrated in FIG. 8, the computing resource service provider 802, in various embodiments, includes an authentication system 816 and a policy management service 818. The authentication system 816, in an embodiment, is a computer system (i.e., collection of computing resources) configured to perform operations involved in authentication of users of the customer. For instance, one of the services 808-814 and 818-822 may provide information from a user to the authentication service 816 to receive information in return that indicates whether or not the user requests are authentic.

The policy management service 818, in an embodiment, is a computer system configured to manage policies on behalf of customers (such as customer 804) of the computing resource service provider 802. The policy management service 818 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 802, in various embodiments, is also equipped with a task service 820. The task service 820 is configured to receive a task package from the customer 804 and enable executing tasks as dictated by the task package. The task service 820 may be configured to use any resource of the computing resource service provider 802, such as one or more instantiated virtual machines or virtual hosts, for executing the task. The task service 822 may configure the one or more instantiated virtual machines or virtual hosts to operate using a selected operating system and/or a selected execution application in accordance with a requirement of the customer 804.

The computing resource service provider 802 additionally maintains one or more other services 822 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services and/or other services.

Figure 9:
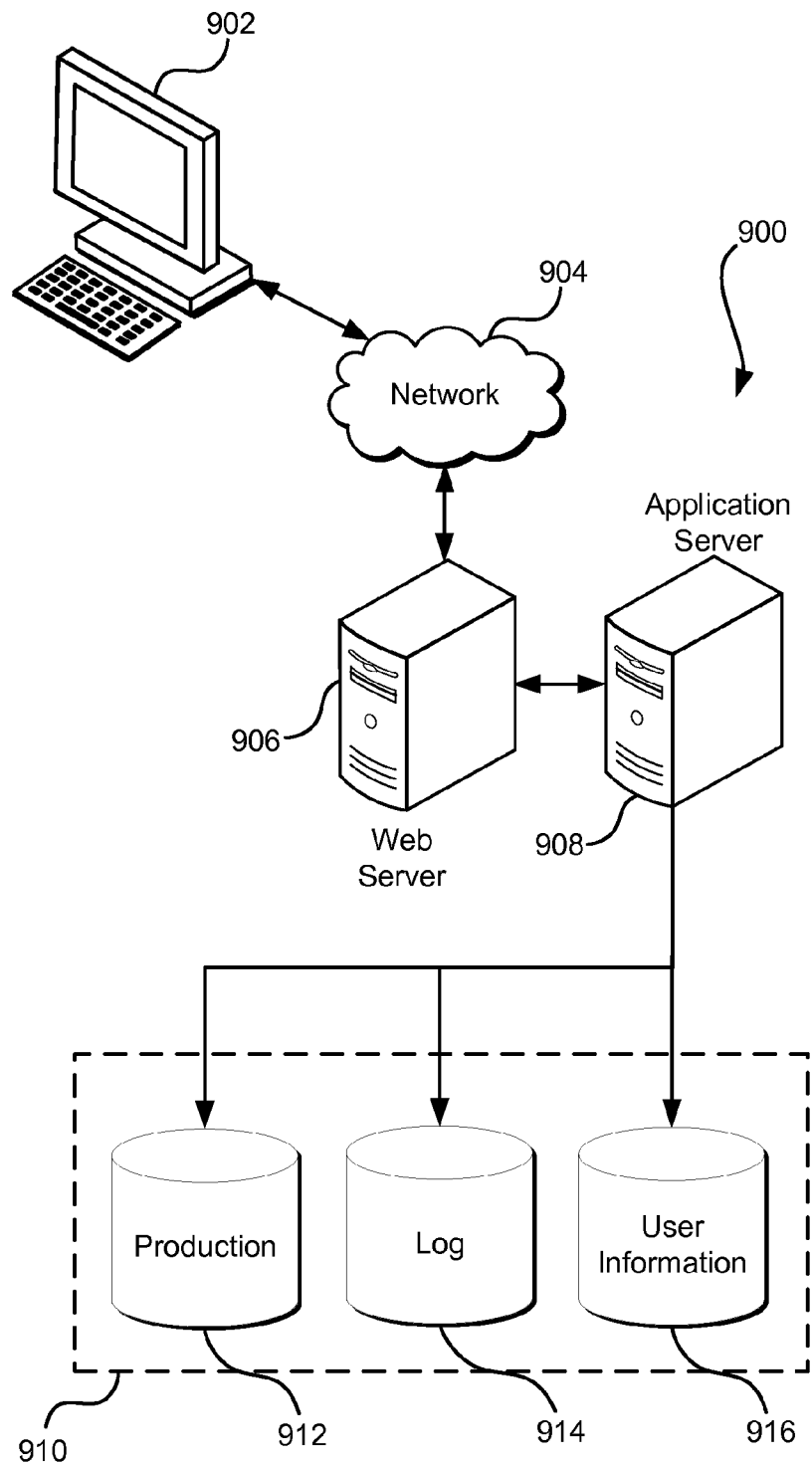
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in at least one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      upon an occurrence of an event for triggering a roll of an interval window,
         retrieving a first interval time value that reflects a first interval time;
         retrieving a second interval time value that reflects a second interval time;
         retrieving a previous accumulator value that reflects a previous output of a hash function;
         retrieving information that represents digests of data collected during a time period defined by the second interval time value and the first interval time value;
         generating a current accumulator value based at least in part on hashing a value based at least in part on the second interval time value, the previous accumulator value, and the information; and
         storing, in persistent storage, the first interval time value and the current accumulator value as a corresponding hash key pair such that the corresponding hash key pair is usable at least in part to validate:
            integrity of data corresponding to the digests; and
            that the digests were collected during the time period.

2. The computer-implemented method of claim 1, wherein the information that represents digests of data is a Bloom filter.

3. The computer-implemented method of claim 1, wherein storing further includes storing a Bloom filter encoding the digests of the data.

4. The computer-implemented method of claim 1, wherein the information that represents digests of data comprises a plurality of digest-timestamp pairs.

5. A system, comprising one or more computing devices configured to provide one or more services, the one or more services configured to, upon an occurrence of an event:
   retrieve a first interval time value;
   retrieve a second interval time value;
   retrieve a previous accumulator value reflecting a previous output of a function;
   retrieve information representing digests of data collected during a time period defined by the second interval time value and the first interval time value;
   generate a current accumulator value based at least in part on the second interval time value, the previous accumulator value, and the information; and
   store the first interval time value and the current accumulator value such that the first interval time value and the current accumulator value is usable at least in part to validate:
      integrity of data corresponding to the digests; and
      that the digests were collected during the time period.

6. The system of claim 5, wherein the information representing digests is retrieved from one or more data stores, the one or more data stores configured to associate digests with timestamps and associate accumulator values with interval time values.

7. The system of claim 5, wherein the event occurs as a result of a fixed time interval passing, a received request to roll an interval window, or one or more objects in the information exceeding a threshold.

8. The system of claim 5, wherein:
   the first interval time value is based at least in part on a clock;
   the second interval time value and the previous accumulator value are retrieved from a data store; and
   the first interval time value and the current accumulator value are provided to the data store.

9. The system of claim 5, wherein the first interval time value and the second interval time value are date-time values measured from a temporal reference point.

10. The system of claim 5, wherein the event occurs as a result of a number of digests in a Bloom filter exceeding a threshold.

11. The system of claim 5, wherein the information representing digests comprises a collection of the digests of the information.

12. The system of claim 5, wherein the one or more services are further configured to, on or after a time indicated by the first interval time value:
   receive a request to timestamp a document;
   generate a digest of the document;
   retrieve a current time; and
   provide the digest and the current time.

13. The system of claim 12, wherein the one or more services are services of a computing resource services provider and the request to timestamp the document is provided by the one or more services.

14. The system of claim 12, wherein the one or more services are services of a computing resource services provider and the request to timestamp the document is provided by a customer of the computing resources services provider.

15. The system of claim 12, wherein the system is further configured to, in response to the request to timestamp a document, provide the current time and the current accumulator value.

16. The system of claim 12, wherein the system is further configured to, in response to the request to timestamp a document, provide a message signed with a digital signature indicating successful storage of the digest of the document.

17. The system of claim 12, wherein the event occurs in response to detecting an attribute within the document for rolling an interval window.

18. A non-transitory computer-readable storage medium having stored thereon executable instructions that, when executed by one or more processors of a computer system, cause the computer system to at least:
receive a request from a requestor to validate data; and
in response to receipt of the request:
retrieve a digest timestamp value corresponding to a digest of the data;
retrieve a first interval time value and a corresponding first accumulator value, wherein the first interval time value indicates a start time of an interval window of the digest timestamp and the corresponding first accumulator value reflects a first output of a function;
retrieve a second interval time value and a corresponding second accumulator value, wherein the second interval time value indicates an end time of the interval window of the digest timestamp and the corresponding second accumulator value reflects a second output of the function;
retrieve information representing digests having timestamp values between the first interval time value and the second interval time value;
generate a hash based at least in part on the first interval time value, the corresponding first accumulator value, and the information;
validate the data by comparing the hash with the corresponding second accumulator value to obtain a validation result; and
output the validation result to the requestor.

19. The non-transitory computer-readable storage medium of claim 18, wherein the instructions further comprise instructions that, when executed by the one or more processors, cause the computer system to at least:
receive an unvalidated timestamp value; and
determine whether the unvalidated timestamp value corresponds to the digest timestamp value.

20. The non-transitory computer-readable storage medium of claim 18, wherein the instructions that cause the computer system to retrieve information representing digests further comprise instructions that, when executed by the one or more processors, cause the computer system to at least retrieve a Bloom filter encoding of the digests as the information.

21. The non-transitory computer-readable storage medium of claim 18, wherein the digest timestamp value corresponding to the digest of the data is the earliest digest timestamp value corresponding to the digest of the data.

22. The non-transitory computer-readable storage medium of claim 18, wherein the digest timestamp value corresponding to the digest of the data is the most recent digest timestamp value corresponding to the digest of the data.

23. The non-transitory computer-readable storage medium of claim 18, wherein the digest timestamp value corresponding to the digest of the data is retrieved from a first data store that associates digests with timestamps and wherein the first interval time value and the corresponding first accumulator values are retrieved from a second data store that associates accumulator values with interval time values.

24. The non-transitory computer-readable storage medium of claim 18, wherein the instructions that cause the computer system to validate the data further include instructions that cause the computer system to respond with verification proof of the comparing.

25. The non-transitory computer-readable storage medium of claim 24, wherein at least a portion of the verification proof comprises a hash prefix reflecting an internal state of the first accumulator value.

* * * * *